United States Patent [19]

Stocker

[11] Patent Number: 5,235,645
[45] Date of Patent: Aug. 10, 1993

[54] SCRAMBLER/DESCRAMBLER SYSTEM FOR DATA TRANSMISSION

[75] Inventor: Kenneth Stocker, Spencerville, Ind.

[73] Assignee: Northwest StarScan Limited Partnership, Kent, Wash.

[21] Appl. No.: 897,434

[22] Filed: Jun. 12, 1992

[51] Int. Cl.$^5$ .............................................. H04L 9/12
[52] U.S. Cl. ........................................ 380/48; 380/9; 380/46; 380/47; 380/49
[58] Field of Search ................... 380/9, 46, 47, 48, 49, 380/34; 375/1

[56] References Cited

U.S. PATENT DOCUMENTS

| | | | |
|---|---|---|---|
| 3,659,229 | 4/1972 | Milton | 380/46 X |
| 3,808,536 | 4/1974 | Reynolds | 380/46 X |
| 4,308,617 | 12/1981 | German, Jr. | 375/1 |
| 4,700,387 | 10/1987 | Hirata | 380/20 |
| 4,876,718 | 10/1989 | Citta et al. | 380/42 |

Primary Examiner—Bernarr E. Gregory

[57] ABSTRACT

A scrambler system is provided for the detection and separation of synchronization signals from data signals, and for the scrambling of the data signals such that no long and repeatable series of one's or zero's are present in the data stream. The scrambler provides an exclusive OR operation to a pseudo random number sequence and the data signals prior to their modulation and transmission. At the receiving end, the identical pseudo random sequence is exclusive OR'ed with the demodulated data, causing the data to be restored to its original form. Thus, an undesirable continuous stream of ones or zeros is eliminated by the scrambler prior to its transmission.

7 Claims, 2 Drawing Sheets

SCRAMBLER/DESCRAMBLER SYSTEM FOR DATA TRANSMISSION

FIELD OF THE INVENTION

This invention relates to the field of digital data transmission and more particularly to a system for encoding and decoding digital data for enhancing clock recovery.

BACKGROUND OF THE INVENTION

In digital communication systems, digital data can be represented as analog signals by use of a modulator/demodulator (modem). The modem converts a series of binary voltage pulses into an analog signal by encoding the digital data onto a carrier radio frequency. The resulting signal occupies a certain spectrum of frequency centered about the carrier and may be propagated across a communication medium. One of the requirements of signal modulation is that no long and repeatable series of one's and zero's be present in the data stream. In the event of such repetition, a surge of power occurs near the radio frequency corresponding to the transmitted one's or zero's. This may result in a peak power to average power ratio higher than the current acceptable FCC standards.

Systems designed to prevent the transmission of continuous bits of one's and zero's are known as scramblers. Typical scrambling techniques that are currently in use provide a regenerative or recursive approach, in which previously transmitted data are used to decode the incoming data. However, a major disadvantage with the recursive type scrambler is that any single bit error that may occur during transmission would propagate and multiply into multiple bit errors. The result is an unacceptable reduction in the effect of any forward error correction employed by the communications system. Thus, there is a need for a scrambling/descrambling device and method which can effectively encode streams of data so that long repetitive patterns of zeros or ones can be prevented without disrupting the reception of data that may have occasional bit errors.

Accordingly, it is an object of present invention to prevent long streams of ones or zeros from appearing in the data stream applied to a radio frequency (RF) modulator of a transmitter.

It is a further object of the present invention to cause a permutation of the data in such a way that a series of continuous ones or zeros is transformed into a pseudo random sequence.

It is yet another object of the invention to provide a scrambler that does not propagate and multiply occasional single bit errors of an otherwise good data signal into multiple bit errors that may disrupt the flow of data.

It is still a further object of the invention to provide a descrambler which is located at the RF destination for reconstructing the permuted data back into the original data sequence.

The foregoing objects and advantages of the invention are illustrative of those which can be achieved by the present invention and are not intended to be exhaustive or limiting of the possible advantages which can be realized.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

In one embodiment of the present invention, a scrambler system provides for the detection and separation of synchronization signals from data signals, and further provides an exclusive OR operation to a pseudo random number sequence and the desired data stream prior to its modulation and transmission. At the receiving end, the identical pseudo random sequence is exclusive OR'ed with the demodulated data, causing the data to be restored to its original form. Thus, the effect of a continuous stream of ones or zeros is eliminated by the pseudo random sequence.

DETAILED DESCRIPTION OF A PREFERRED EMBODIMENT

The present invention contemplates an improved scrambling and descrambling circuit for a compressed video data signal prior to radio frequency ("RF") transmission of the signal.

Figure 1:
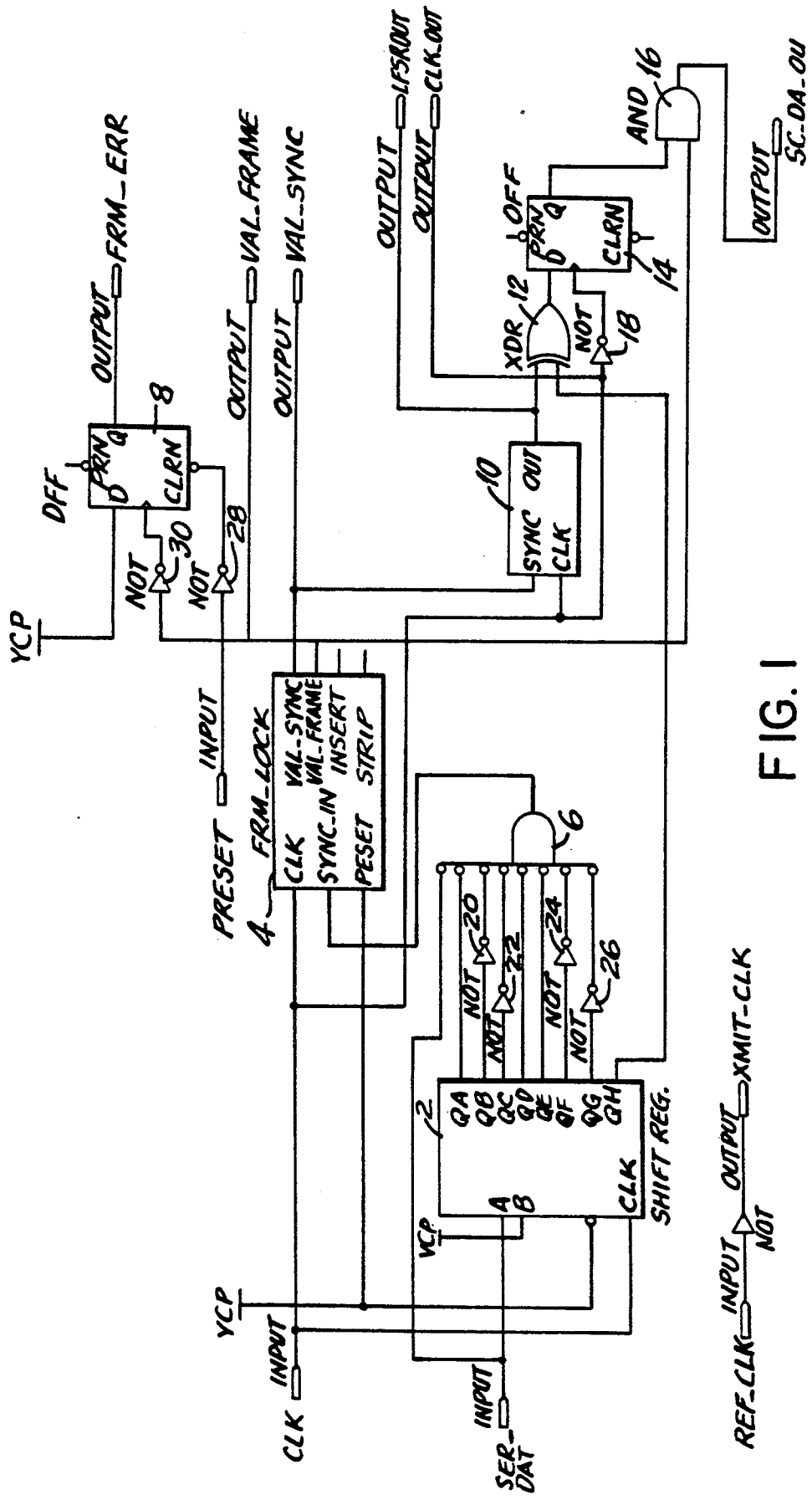
FIG. 1 is a partial block diagram and a partial logic diagram illustrating the scrambler of the present invention.

Referring to the drawings, wherein like numerals refer to like components, there is illustrated in FIG. 1 one embodiment of the present invention. In FIG. 1, a block diagram of the scrambler circuit 1 embodying the present invention is shown.

The circuit 1 includes, generally, a shift register circuit 2, a frame locking circuit 4, an adder 6, a flip-flop 8, pseudo-random number generator 10, an exclusive OR gate 12, and flip-flop 14 A clock ("CLK") signal is applied to some, but not all, components of the scrambler 1 to provide timing pulses, as is commonly practiced in the art.

Data transmitted to the scrambler 1 is preferably formatted into frames that consist of a pre-selected multibit synchronization ("sync") character followed by 1048 bits of data. This stream of sync bits and data ("SER DAT" on FIG. 1) is applied to the A input of shift register 2. The shift register 2 preferably comprises a chain of eight flip-flops sequentially connected together in a circuit, but it is not so limited. As is apparent to one skilled in the art, the particular type of shift register employed in the present invention is not limited to a sequential chain of flip-flops, for the purpose of shifting stored data. Accordingly, other shift registers known in the art may be used to accomplish a similar result, without departing from the scope of the invention.

The shift register 2 contains single-bit parallel outputs QA through QH, in which QH is preferably the output connection of the data stream after it is sequentially shifted through the eight flip-flops. The outputs QA, QD and QE are directly connected to adder 6, while the QB, QC, QF, and QG outputs of shift register 2 are connected to the inputs of NOR gates 20, 22, 24 and 26. The outputs of NOR gates 20, 22, 24 and 26 are then connected to the input of adder 6. The output QH of shift register 2 is not connected to adder 6, but rather it is connected to the input of eclusive-OR gate 12.

Referring back to adder 6, its output is applied to a SYNC-IN input of FRAME-LOCK circuit 4. The CLK signal is also applied to an input of the Frame-Lock circuit 4, specifically the CLKS input of the circuit. In the preferred embodiment, the FRAME-LOCK circuit 4 has a valid sync signal output ("VAL-SYNC") and a valid frame signal output ("VAL-FRAME").

Figure 2:
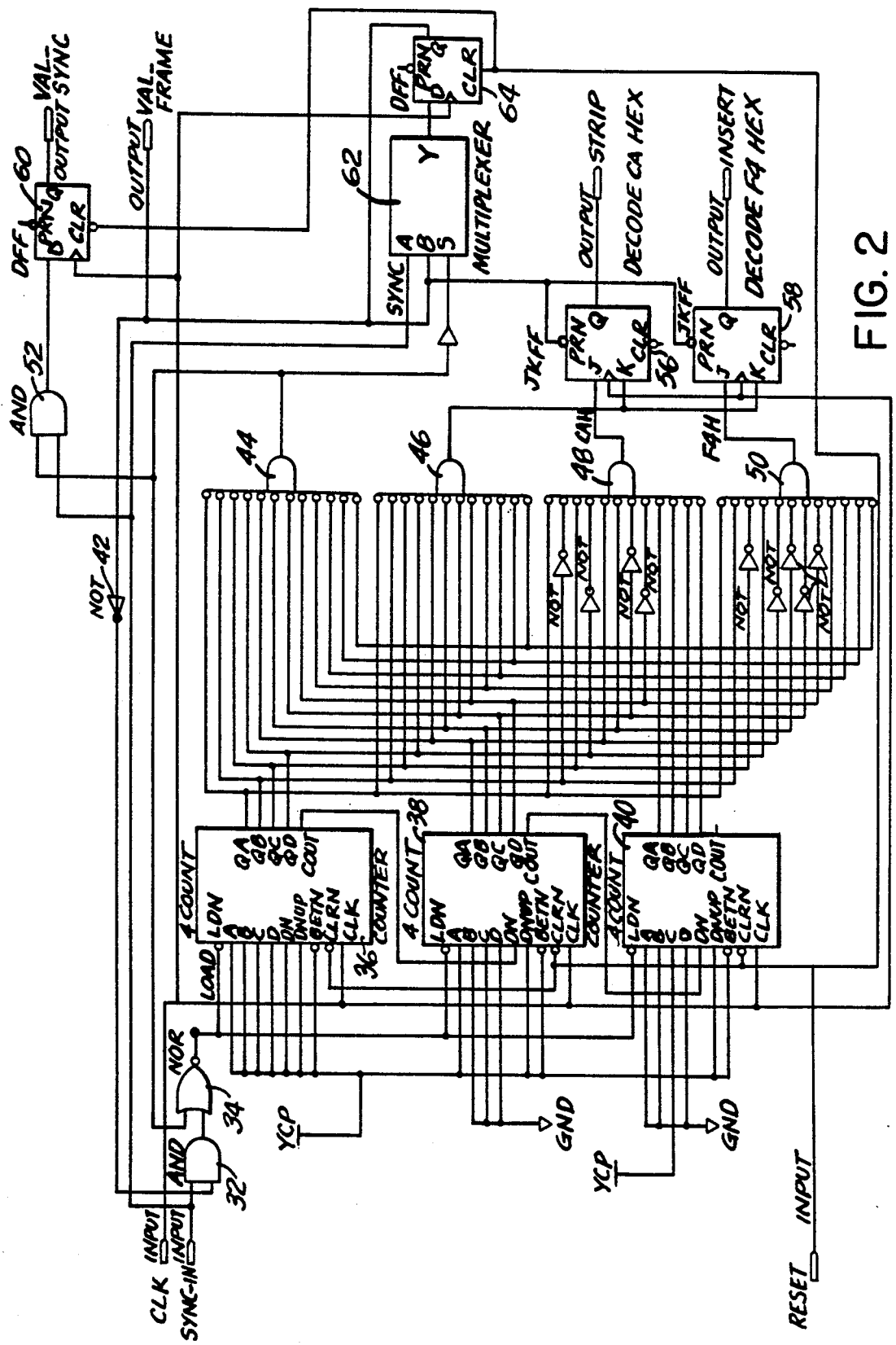
FIG. 2 is a partial block diagram and a partial logic diagram illustrating the frame lock circuit of the present invention.

In FIG. 2, the FRAME-LOCK circuit 4 is shown in greater detail. The SYNC-IN signal from the AND gate 6 (shown in FIG. 1 only) is connected to the input of an AND gate 32. The output of a NOT gate 42 (an inverted VAL-FRAME signal) is also connected to the input of AND gate 32. The output of AND gate 32 along with the output of an AND gate 44 are connected to the input of a NOR gate 34. The output of NOR gate 34 is applied to the load input of each of three 4-bit up-down counters 36, 38 and 40 that are sequentially linked together. The 4-bit counters preferably are the type that are well known and commercially available in the industry, but the invention is not so limited in that any suitable device for providing a counter function may be used in the present invention. The output of the counters 36, 38 and 40 are each connected in parallel to the inputs of AND gates 44, 46, 48 and 50.

As mentioned above, the output of AND gate 44 is connected to the input of NOR gate 34. However, the output of AND gate 44 is also connected to the SELECT input of a 2 to 1 multiplexer ("mux") 62 ,through a buffer 54. The mux 62 is used to select between the SYNC signal containing the serial data stream that is applied to one input, and the output of the mux 62 itself, that is fed back to the second input of the mux 62 after being applied to flip-flip 64. Advantageously, the output of flip-flop 64 is the VAL-FRAME signal that is an output of the overall FRAME-LOCK circuit 4. It should be noted that the particular type of multiplexer used is not critical to the invention, and other devices suitable for selectively providing one output from two inputs may also be used.

The output of AND gate 44 is also connected to the input of a third component, namely AND gate 52. The SYNC-IN signal is applied to the other input of the AND gate 52, and the output of these ANDed signals is connected to the input of flip-flop 60. The output of flip-flop 60 is the VAL-SYNC output of the overall FRAME LOCK circuit 4.

Returning to FIG. 1, the VAL-SYNC output FRAME-LOCK circuit 4 is connected to the input trigger of pseudo-random number generator 10, and its output is connected to the input of the exclusive-OR gate 12, along with the QH output of shift register 2. The output of the exclusive-OR gate 12 is applied to flip-flop 14, whose input trigger is connected to the CLK signal by NOR gate 18.

The output of flip-flop 14 is connected to an input of an AND gate 16. Also connected to AND gate 16 through an input connection is the VAL-FRAME output of the FRAME LOCK circuit 4. The output of AND gate 16 is the scrambled data that is now ready to be RF modulated and transmitted.

To provide a data/frame error signal, the VAL-FRAME output of the FRAME LOCK circuit 4 is also connected to a NOT gate 30. The output of NOT gate 30 is connected to the trigger input of flip-flop 8, which provides the frame error signal.

The scrambler 1 operates by first locating and locking on to the sync characters in the incoming data which mark the beginning of the frame or block of data bits.

The shift register 2, which serves as an input to the stream of serial data signals, is triggered by the clock signal CLK that is preferably not transmitted with the incoming data signal. The shift register 2 outputs data and sync signals in a single-bit parallel fashion via outputs QA through QH. The QB, QC, QF, and QG outputs of shift register 2 are inverted by NOT gates 20, 22, 24 and 26 and are added to the QA, QD, QE outputs, and to the serial data input by adder 6. The resulting output of adder 6 provides the sync signal for the FRAME LOCK circuit 4 when a preselected series of sync characters in the incoming data stream marks the beginning of a frame of data.

In the preferred embodiment, the receipt of the proper characters is used to cause the adder 6 to trigger a SYNC IN signal of the FRAME LOCK circuit 4, which in turn outputs the VAL-SYNC signal when a CC hex pattern is detected.

Once the FRAME LOCK circuit 4 locates and locks on to the pre-selected sync characters in the incoming stream of signals, the VAL-SYNC signal is output to mark the beginning of a frame of data. The VAL-SYNC signal resets the pseudo-random number generator 10 to an initial state. The pseudo-random number generator 10 then outputs a pseudo-random number sequence that is combined with the data stream that has been stepped through the shift register 10 and outputted at QH. Next, the exclusive-OR gate 12 performs an exclusive-OR operation on the data bits of each frame with a constant bit pattern produced by the pseudo-random number generator 10. In a preferred embodiment the sequence of the pseudo random number generator is such that the first 10 serial bits out are zero. In this way, the frame sync character is not scrambled. However, long sequences of static data (all 0's or all 1's) are prevented, thereby providing an acceptable distortion of the transmitted RF spectrum.

The data scrambled by the exclusive-OR gate 12 is then applied to the flip-flop 14 where it is outputted upon receipt of an inverted (by invertor 18) CLK signal. In other words, scrambled data is outputted from the flip-flop 14 in between intervals of normal clock triggering.

After the scrambled data is held by the flip-flop 14, it is applied to AND gate 16 along with the VAL-FRAME signal that is applied by the FRAME LOCK circuit 4. The later signal gates the AND gate 16, so that only scrambled data from a valid frame is transmitted by the scrambler 1.

It is anticipated that the recipient of the scrambled data produced by the scrambler 1 will have a descrambler that is comprised of the same circuit as the scrambler 1. In other words, the circuit described for scrambling the data can also be used to decode the scrambled data.

The scrambler and descrambler both encode and decode data in the same way. Accordingly, running data through the scrambler 1 scrambles it, and running the scrambled data through the descrambler 1 descrambles it. The primary differences in the devices are between the data acquisition and retransmission operations. The scrambler accepts data in a single bit, serial format and retransmits the same. The descrambler accepts data and retransmits it in an unscrambled, serial format. In addition, the descrambler may include an I/Q phase resolver, of the type commonly available in the industry, which the scrambler 1 does not. Thus, the basic differences are in the signal acquisition of the data input and the format of the data output, as would be understood by a person skilled in the art.

One other difference between the two devices may be how loss Of the sync signal is handled. In the scrambler 1, if the sync pattern is somehow not detected at the proper time interval, sync is assumed lost and the scrambler 1 enters a sync acquisition mode, where it is searching for sync signal. On the other hand, the descrambler requires the non-detection of sync for 4 consecutive sync intervals before the sync acquisition mode is initiated. Advantageously, with this arrangement the descrambler can survive occasional bit errors in sync without disrupting the reception of data in an otherwise good signal.

It is to be understood that the present invention may be used with equal facility and advantage in digital signal devices other than data communications devices. Moreover, although the invention has been described in detail with particular reference to a preferred embodiment thereof, it should be understood that the invention is capable of other and different embodiments, and its details are capable of modification in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

I claim:

1. In a digital communication system having a transmitter and a receiver for transmitting and receiving information corresponding to digital data, said digital data organized in frames of data each frame having a synchronous field and a data field, said transmitter and receiver each having a scrambler/descrambler system comprising:
    a synchronous field detector receiving said digital data, said synchronous field detector providing a sync signal when a preselected series of sync characters in said digital data indicate the beginning of a frame;
    a frame lock circuit responsive to said sync characters, said frame lock circuit providing a valid sync signal indicating the presence of a valid sync, and a valid frame signal indicating the presence of a valid frame;
    a pseudo random generator responsive to said frame lock circuit, said pseudo random generator being reset when said valid sync signal is first detected generating a pseudo random data sequence; and
    an exclusive-OR gate for performing an exclusive-OR operation on said pseudo random data sequence and said data.

2. The invention as claimed in claim 1, wherein said pseudo random generator is a feedback shift register.

3. The invention as claimed in claim 2 wherein the sequence of the pseudo random number generator is such that the first 10 serial bits generated after each time that the generator is reset are zero.

4. The invention as claimed in claim 3 wherein said transmitter transmits signals as long as said valid frame signal indicates the presence of a valid frame.

5. The invention as claimed in claim 4, further comprising a frame-error circuit coupled to said frame lock circuit, said frame-error circuit providing a frame-error signal in response to said valid frame signal.

6. The invention as claimed in claim 5 wherein said transmitter enters a sync acquisition mode when a preselected sync pattern is not detected at the proper time interval.

7. The invention as claimed in claim 6 wherein said receiver enters a sync acquisition mode when a preselected sync pattern is not detected for a predetermined number of consecutive sync intervals.

* * * * *